Jan. 13, 1959 H. C. SAUER 2,867,845
APPARATUS FOR MOLDING AND CURING BELTS
Filed Nov. 28, 1956 3 Sheets-Sheet 1

INVENTOR.
HERMAN C. SAUER
BY
Irwin M. Lewis
ATTORNEY

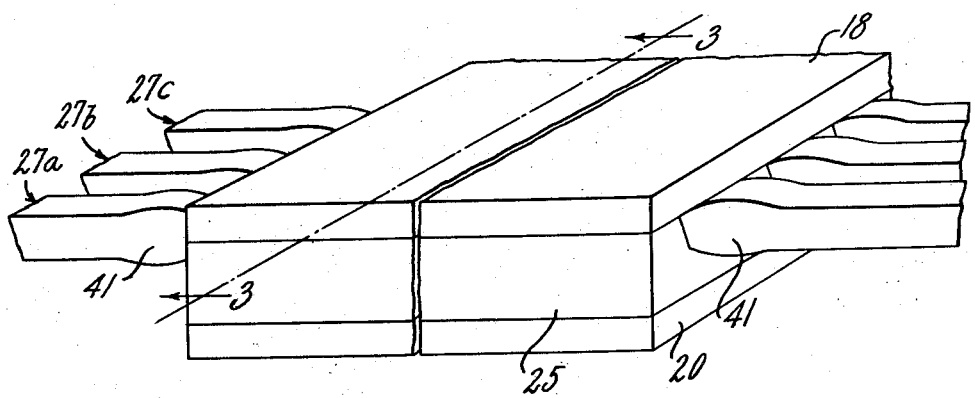
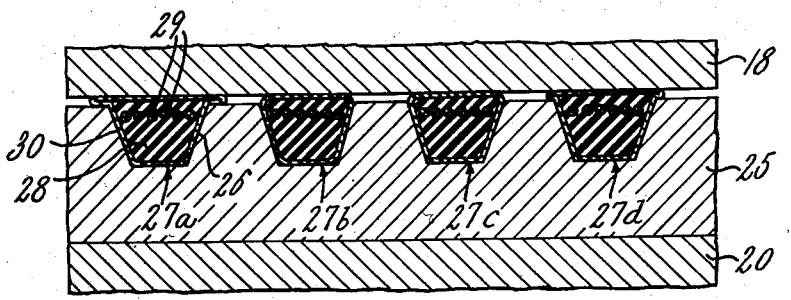

Jan. 13, 1959          H. C. SAUER          2,867,845
APPARATUS FOR MOLDING AND CURING BELTS
Filed Nov. 28, 1956          3 Sheets-Sheet 3
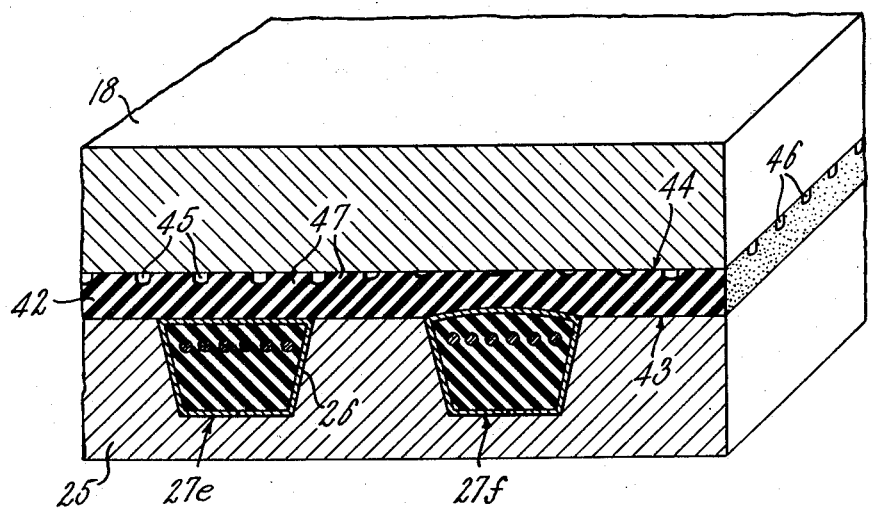
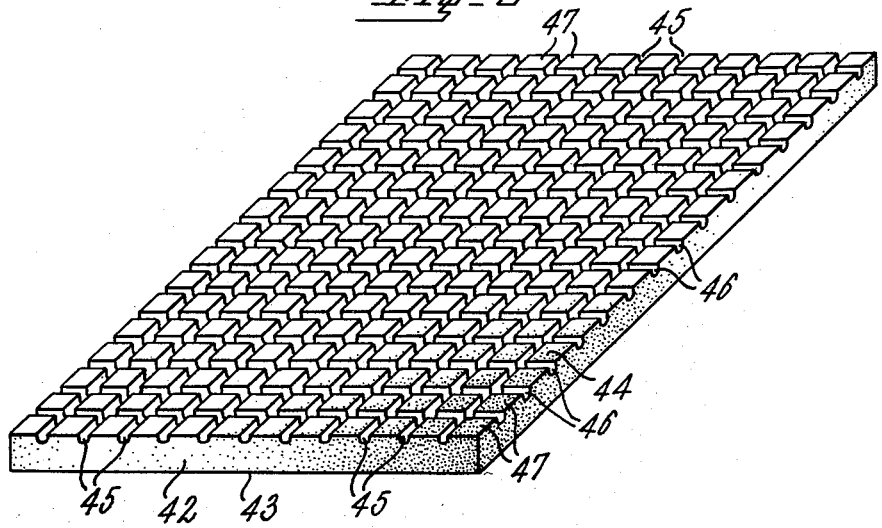
INVENTOR.
HERMAN C. SAUER
BY
Irwin M. Lewis
ATTORNEY

United States Patent Office 2,867,845
Patented Jan. 13, 1959

---

2,867,845

APPARATUS FOR MOLDING AND CURING BELTS

Herman C. Sauer, Ambler, Pa., assignor to United States Rubber Company, New York, N. Y., a corporation of New Jersey Application November 28, 1956, Serial No. 624,825

3 Claims. (Cl. 18—17)

---

This invention relates generally to the treatment of power transmission belts, and more particularly to an improved apparatus for molding and curing various types of belts, including V-belts. The invention pertains in one of its more specific aspects to simultaneously molding and curing continuous belts with the aid of an elastomeric blanket member which is interposed between a mold containing a section of an uncured belt, and a pressure applying platen whereby to obtain a cured belt having desired properties and characteristics.

Press cured V-belts are generally full jacketed or fabric covered. In the manufacture of such belts, it has usually been the practice to place a strip of so-called "seal" rubber over the entire outer peripheral surface of each belt. The seal strip, which is approximately $\frac{1}{32}''$ to $\frac{1}{16}''$ thick and equal in width to the belt outer peripheral width, is used to insure that the finished belt will have an appearance of being fully molded and to provide sharply defined outer edges. The utilization of the seal strip is intended to reduce irregularities in belt volume which are caused by jacket splices, gauge variations of the various belt components and cut or skive tolerances, because, in molding, any excess material of the belt is forced over the mold cavity edges and into overflow grooves that are provided in conventional molds.

For the purpose of preventing porosity, blisters and poor adhesion in a finished belt, it has generally been the practice to employ an excess of seal rubber on the outer peripheral width of the belt rather than an insufficient amount. This has a detrimental effect, especially in belts of relatively large cross section, for the reason that the excess seal rubber cannot always flow into the overflow grooves either because such grooves are already filled with rubber or the rubber may overflow before the belt is sufficiently compressed with the result that there is a deficiency of rubber when the belt is compressed. As a consequence, the belt materials are caused to flow longitudinally or to "push" beyond the open ends of the mold cavities, resulting in deformations, such as lumps or enlargements in the belt and/or rupture of the jacket fabric. This push eventually causes the belts to increase in length and thus they are not all cured under equal tension on the tensioning pulleys. Since many belts, particularly those of larger size are often sold and used in sets, it will be appreciated that it is frequently difficult to obtain a matched set of belts from one load of belts that are molded and cured with conventional equipment.

Another disadvantage of the above outlined conventional procedure is that additional time and labor are required to process and apply the material for the seal rubber, to remove the rind from the mold overflow groves, after each intermediate cure, and to trim the flash from each belt after cure is completed. Moreover, due to the molding pressure exerted on belts employing seal rubber strips, the cord lines of such belts are frequently distorted, the amount of rubber at the outer peripheral edges is frequently excessive, or the sealing strip may be loose, resulting in an uneconomically high proportion of rejects and loss of material in the amount of the overflow.

The above-mentioned objections and disadvantages are obviated by the practice of this invention and without the use of seal rubber strips as will be evident from the detailed description appearing further along herein.

It is a primary object of this invention to provide an improved and relatively simple apparatus for molding and curing various types of belts.

Another object of the invention is to provide an apparatus for producing continuous belts that are substantially uniform in length, density and cross sectional configuration.

Another object of the invention is to impart substantially uniform tension to longitudinal reenforcing cords that are generally incorporated in belts.

Another object of the invention is to produce continuous belts having smooth, uniform, outer peripheral surfaces and sharp peripheral edges.

The invention has for a further object the effecting of reductions in time and labor in producing finished belts.

A still further object of the invention is to improve the active service life and the appearance of belts.

To the end that the foregoing objects may be readily attained, a preferred and recommended arrangement of apparatus according to this invention includes a conventional hydraulic press which comprises a horizontal stationary platen and a pair of vertically reciprocable platens that are respectively positioned above and below the stationary platen. The stationary platen carries an upper mold plate and a lower mold plate. Each mold plate is provided with a plurality of rectilinear cavities. The apparatus includes means for subjecting a plurality of uncured continuous belts to tension and maintaining sections of the belts in at least partial registry with corresponding mold cavities. The several platens are provided with passages for transmitting a suitable fluid, such as steam whereby to supply necessary heat during the curing procedure or they may be electrically heated.

A resilient, deformable, compressible, blanket member is interposed between each reciprocable platen and corresponding mold plate. This member comprises an elastomeric material, such as cured Butyl rubber (which, as is well-known, is a rubbery copolymer of a major proportion of isobutylene and a minor proportion of a conjugated diolefin containing from 4 to 6 carbon atoms per molecule), or any heat resisting compressible resilient material of substantial thickness and having a first surface facing a reciprocable platen and a second surface which is substantially parallel to the first surface and which faces a corresponding mold plate. Each blanket member is formed with a plurality of intersecting grooves extending inwardly from its first surface to obtain a plurality of lands. The blanket members are adapted to be compressed upon predetermined movement of the reciprocable platens toward the stationary platen with its lands and second surface bearing, respectively, against the corresponding reciprocable platen and mold plate. Thus, when the member is placed under pressure, the lands will deform independently of each other and flow into adjacent grooves, thereby permitting the member to "give" or be reduced in thickness while retaining its normal length and width dimensions. As a consequence, there is no tendency for excess belt material, if any, to flow or push lengthwise toward the open ends of the mold cavities since the member is not elongated. Inasmuch as the smooth surface of the blanket member bears against the outer surface of the belt sections in the mold, such sections will be uniformly compressed and the outer peripheral surfaces of the finished belts will also be smooth as will be clear from the detailed description that follows.

The enumerated objects and other objects, together with the advantages of this invention will be readily understood by persons versed in the art from the following detailed description and the accompanying drawings which respectively describe and illustrate a preferred arrangement of apparatus embodying the invention.

In the drawings:

Fig. 2 is a perspective view of certain parts of conventional molding and curing equipment, illustrating a plurality of belt sections associated with the equipment;

Fig. 3 is a view taken along line 3—3 of Fig. 2;

Fig. 4 is a view similar to Fig. 3 and illustrates the construction and relationship of certain parts of the apparatus of this invention; and Fig. 5 is a perspective view of a preferred form of blanket member of this invention.

Figure 1:
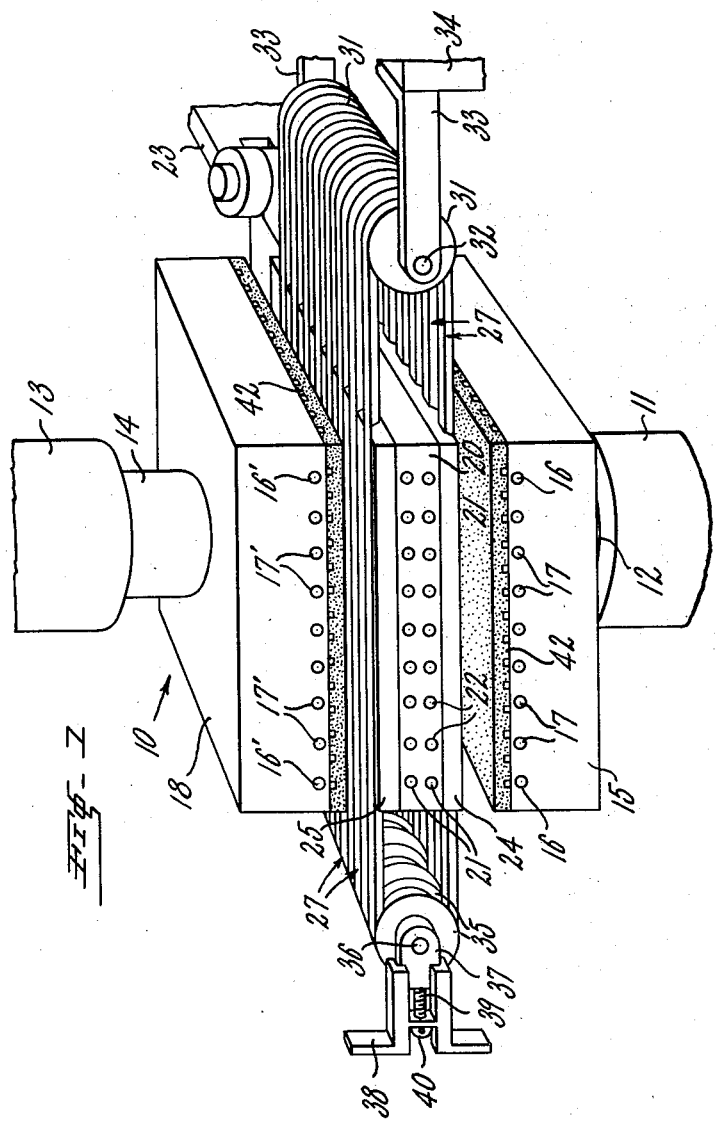
Fig. 1 is a perspective view of apparatus constructed in accordance with this invention.

Referring now to the drawings wherein like reference numerals denote corresponding parts throughout the several views, I have shown in Fig. 1 portions of a hydraulic press 10 which includes a lower cylinder 11, a lower piston 12, an upper cylinder 13 and an upper piston 14. The cylinders are stationary while the pistons are vertically aligned and reciprocable in corresponding cylinders. A lower platen 15 is mounted on and reciprocable with lower piston 12. This platen has a planar horizontal upper surface and is provided with a pair of outer passages 16 and a plurality of intermediate passages 17 that are formed below and adjacent to that surface. Passages 17 are adapted to transmit a suitable fluid, such as steam, through the platen to heat the platen and associated parts during the belt molding and curing procedure. Passages 16, on the other hand, serve to supply a cooling fluid for chilling portions of the belts in a manner well known to the art. An upper platen 18 is secured to and reciprocable with upper piston 14. This platen is preferably the same as platen 15 except that it is inverted. Platen 18 is provided with passages 16' and 17' corresponding to passages 16 and 17, respectively, of plates 15.

The press also includes a stationary platen 20 which is positioned between, aligned with and parallel to platens 15 and 18. Platen 20 is provided with outer passages 21 and intermediate passages 22, corresponding in location and function to passages 16 and 16' and 17 and 17', respectively. Platen 20 is attached to the press frame (not shown) by one or more brackets 23.

Secured to and bearing against opposite faces of platen 20 is a pair of mold plates, namely a lower mold plate 24 and an upper mold plate 25, which are identical but inverted with respect to each other. Each mold plate is formed with a plurality of spaced, parallel, rectilinear cavities 26. As shown in Figs. 3 and 4, the illustrated mold cavities are trapezoidal in transverse configuration for substantially determining the final cross sectional shape of V or trapezoidal continuous belts 27 (Fig. 1). Each mold cavity in lower mold plate 24 is vertically aligned with and parallel to a corresponding cavity in upper mold plate 25.

The belts shown in Figs. 2, 3 and 4 are individually identified by numerals 27a, 27b, 27c and 27d in Figs. 2 and 3 and by numerals 27e and 27f in Fig. 4. These belts may be of any known composition and construction. Each illustrated belt comprises a body 28 (Fig. 3), consisting of uncured rubber or rubberized plies of a suitable fabric, a plurality of reenforcing cords 29 for imparting longitudinal strength to the belt and/or a fabric jacket or wrapper 30.

The belts are supported and tensioned during molding and curing by devices that will now be described, reference being had to Fig. 1. Such devices include a first plurality of pulleys 31 which are rotatable about a first shaft 32. This shaft is journaled at its ends in angle brackets 33 which are affixed to a stationary supporting structure 34. Means (not shown) are provided to permit ready removal of shaft 32 from brackets 33, as required.

The belt supporting and tensioning devices also include a second plurality of pulleys 35 which are rotatable about a second shaft 36 that is parallel to shaft 32. Shaft 36 is mounted at its ends in blocks 37, only one of which is shown. Each block 37 is horizontally slidable in an H-bracket 38 which is affixed to a stationary support (not shown). A bolt 39 extends through the web of the H-bracket and threadedly engages a tap (not shown) in slide block 37. Bolt 39 has a capstan head 40 to permit turning of the bolt and sliding movement of its block whereby to adjust the tension on the belts. The parts are so constructed and arranged that upper and lower rectilinear sections of each belt are parallel and positioned in corresponding mold cavities.

Figs. 2 and 3 illustrate the effect of molding and curing belts in accordance with conventional practice wherein reciprocable platen 18 bears directly against sections of the belts that are positioned in the cavities of mold plate 25. In this connection, it will be observed that the materials of the belts may be compressed so as to flow longitudinally, resulting in enlargements, such as lumps 41, in the portions of the belts adjacent the outer ends of the mold cavities (Fig. 2).

Also the upper parts of the jacket fabric may be deformed and caused to extend beyond the sides of the belts as illustrated in belts 27a and 27d in Fig. 3. The foregoing frequently causes rupture of the jacket fabric. Moreover, it is necessary to trim the excess fabric material and any flash that may be formed in the course of molding and curing individual belts.

The difficulties experienced in the past are eliminated by employing a blanket member of the character mentioned above. A preferred form of blanket member is shown in detail in Figs. 4 and 5 and is identified by numeral 42. The member has a first surface 43 which is smooth and uninterrupted and a second surface 44 which is parallel to surface 43. The member is provided with intersecting pluralities of grooves 45 and 46 which extend inwardly from surface 44 to obtain a plurality of lands 47. Grooves 45 and 46 are shown as being rectilinear and at right angles to each other. It is to be understood that these grooves need not be rectilinear or at right angles. The grooves may, for example, be of a sinusodial form, or run diagonally.

Each blanket member 42 is preferably secured to a corresponding reciprocable platen and movable therewith. If desired, the members need not be attached to such platens, but may be manually inserted in and removed from the press, as required.

When blanket members 42 are placed under pressure by the platens during operation, the lands 47 are deformed independently of each other thereby permitting each member to "give" or be reduced to thickness while retaining its original length and width dimensions. Hence, there is no tendency for the belt materials to flow toward the open ends of the mold cavities as the members 42 are not elongated when in active use. Since the smooth surface 43 of each member 42 bears against the outer peripheries of the belts, such peripheries of the finished belts will be smooth and the outer peripheral edges will be well defined and sharp, as shown in Fig. 4. It will be observed that belt 27e has a sectional area that is the same as that of the mold cavities while belt 27f has a sectional area that is slightly greater than that of its cavities. In either case the density of all belts is uniform by virtue of employing the blanket members. If the sectional area of a particular uncured belt is less than that of the mold cavities, the finished belt will have the same density as that of belt 27e, for example, due to the utilization of members 42.

From the foregoing, it is believed that the apparatus for practicing this invention will be readily comprehended by persons skilled in the art, without further description. It is to be clearly understood, however, that various changes in the apparatus herewith shown and described, and in the method of practicing the invention, may be resorted to without departing from the spirit of the invention as defined by the appended claims.

Having thus described my invention, what I claim and desire to protect by Letters Patent is:

1. In apparatus for molding and curing a continuous belt which contains rubber or the like, a press including a first platen and a second platen, one of the platens being movable toward and away from the other platen, a mold plate carried by the first platen and having an elongated rectilinear cavity extending inwardly from the surface thereof that is remote from the first platen, said cavity having a configuration corresponding to that to be attained in the belt, means for subjecting the belt to tension and for maintaining a rectilinear section of the belt in at least partial registry with the cavity, and means interposed between the mold plate and the second platen and comprising a resilient, deformable, compressible, blanket member having a first surface facing said surface of the mold plate and a second surface substantially parallel to the first surface and facing the second platen, said member having a plurality of intersecting grooves extending inwardly from its second surface, the parts being so constructed and arranged that the first surface of the member is adapted to bear against said surface of the mold plate and said section of the belt and the member is compressed upon predetermined movement of said one of the platens toward the other platen.

2. In apparatus for molding and curing a continuous belt which contains rubber or the like, a press including a stationary platen and a reciprocable platen that is movable toward and away from the stationary platen, a mold plate carried by the stationary platen and having an elongated rectilinear cavity extending inwardly from the surface thereof that is remote from the stationary platen, said cavity having a configuration corresponding to that to be attained in the belt, means for subjecting the belt to tension and for maintaining a rectilinear section of the belt in at least partial registry with the cavity, and a member carried by and reciprocable with the reciprocable platen and comprising a resilient, deformable, compressible material, such as cured rubber, said member having a first surface facing and bearing against the reciprocable platen and a second surface substantially parallel to the first surface and facing said surface of the mold plate( said member having a plurality of intersecting grooves extending inwardly from its first surface, the platens and the member being so constructed and arranged that the second surface of the member is adapted to bear against said surface of the mold plate and said section of the belt and the member is compressed upon predetermined movement of the reciprocable platen toward the stationary platen.

3. In apparatus for molding and curing a plurality of continuous belts which contain rubber or the like, a press including a stationary platen and a reciprocable platen that is movable toward and away from the stationary platen, a mold plate carried by the stationary platen and having a plurality of elongated, parallel, rectilinear cavities extending inwardly from the surface thereof that is remote from the stationary platen, each cavity having a transverse configuration corresponding to that to be attained in the belts, means for subjecting the belts to tension and for maintaining a rectilinear section of each belt in at least partial registry with a corresponding cavity, and a member carried by and reciprocable with the reciprocable platen and consisting of a piece of cured Butyl rubber, said member having a first surface facing and bearing against the reciprocable platen and a second surface substantially parallel to the first surface and facing said surface of the mold plate, said member having intersecting first and second pluralities of spaced grooves projecting inwardly from its first surface, each of the first plurality of grooves extending in one general direction, each of the second plurality of grooves extending in another general direction, the platens and the member being so constructed and arranged that the second surface of the member bears against said surface of the mold plate and said section of each belt and the member is compressed upon predetermined movement of the reciprocable platen toward the stationary platen.

References Cited in the file of this patent

UNITED STATES PATENTS

| | | |
|---|---|---|
| 2,253,792 | Leavenworth | Aug. 26, 1941 |
| 2,602,188 | Gorecki | July 8, 1952 |

FOREIGN PATENTS

| | | |
|---|---|---|
| 517,655 | Canada | Oct. 18, 1955 |